United States Patent [19]
Asano et al.

[11] 3,848,169
[45] Nov. 12, 1974

[54] DYNAMIC BRAKING CONTROL

[75] Inventors: Tetsumasa Asano; Takaaki Soga; Mitsuro Kitano, all of Himeji, Japan

[73] Assignee: Mitsubishi Denki Kabushiki Kaisha, Tokyo, Japan

[22] Filed: Apr. 16, 1973

[21] Appl. No.: 351,586

[30] Foreign Application Priority Data
Apr. 18, 1972 Japan.............................. 47-38865

[52] U.S. Cl. ............................... 318/376, 318/381
[51] Int. Cl. .............................................. H02p 3/14
[58] Field of Search .......................... 318/375–381

[56] References Cited
UNITED STATES PATENTS
3,054,037  9/1962  Gaddis et al..................... 318/381 X
3,378,749  4/1968  Cunningham...................... 318/381
3,735,220  5/1973  Renner et al. .................. 318/376 X Primary Examiner—Robert K. Schaffer
Assistant Examiner—W. E. Duncanson, Jr.
Attorney, Agent, or Firm—Robert E. Burns; Emmanuel J. Lobato; Bruce L. Adams

[57] ABSTRACT

Dynamic braking of a dc motor is controlled by forming two electrical quantities representing a field current and an armature current or a rotational speed of the motor respectively and adding the two electrical quantities to each other. Then a field regulator controls the field current so as to maintain the sum of the two electrical quantities substantially constant.

6 Claims, 2 Drawing Figures

3,848,169

DYNAMIC BRAKING CONTROL

BACKGROUND OF THE INVENTION

This invention relates to a control system for controlling dynamic braking of a dc motor suitable for use with a motor vehicle or the like and more particularly to such a system of field regulation type simple in construction and capable of providing a substantially constant braking force over a wide range of changes in rotational speed of the associated motor.

It is generally the practice to operate dc motors as electric generators by having their fields separately excited in order to apply a braking force to the associated load. In that event, if the excitation of the field is maintained constant then a decrease in the number of rotations in unit time of the motor is accompanied by a decrease in a voltage generated across the armature and therefore in an armature current. This results in a reduction in braking force. In order to avoid such an objection, it is required to increase a field current with a decrease in the number of rotations in unit time of the motor. Alternatively, it is necessary to decrease a resistance of the armature resistor grids involved thereby to prevent a decrease in the armature current.

The regulation of the armature resistor grids is characterized in that the resulting braking force is sufficiently high up to a low speed range but an attempt to increase a control an accuracy with which a desired braking force is obtained leads to the necessity of sequentially switching the particular high power resistor grids to a multiplicity of resistance steps resulting in a large, expensive apparatus. On the other hand, the sequential switching the resistor grids to a small number of resistance steps gives rise to a problem of imparting mechanical shocks to the motor. Therefore it has been commonly practiced to regulate the field of motors while sequentially switching armature resistor grids to several resistance steps. The regulation of the field has been accomplished by controlling a field current flowing therethrough in inverse proportion to the number of rotations in unit time of the motor. Conventional arithmetic circuits used for this purpose are not only complicated and expensive but also do not effect the calculation with a satisfactorily high accuracy because of the utilization of a simple approximation method using broken lines.

Accordingly it is an object of the present invention to eliminate the disadvantages of the prior practice as above described by the provision of a new and improved control system of field a regulation for controlling dynamic braking of a dc motor, simple and cheap in construction and capable of providing a substantially constant braking force over a wide range of changes in a rotational speed of the motor.

SUMMARY OF THE INVENTION

The present invention provides a control system for controlling dynamic braking of a dc motor having an armature and a field winding, comprising excitation means including a source of alternating current and rectifier means including thyristors for separately exciting the field winding of the motor, first sensor means for deriving a first electrical quantity representative of a sensed magnitude of a current flowing through the field winding, second sensor means for deriving a second electrical quantity representative of a voltage induced across the armature of the motor, and adder means for summing the first electrical quantity from the first sensor means and the second electrical quantity from the second sensor means. The sum of the first and second electrical quantities from the adder means is compared with a reference magnitude. Field regulator means is provided for regulating the field current by controlling the excitation means so as to render a deviation of the sum of both electrical quantities from the reference magnitude smaller. The field regulator means is operative to regulate the field current so that the sum of the first and second electrical quantities is maintained substantially constant.

Preferably the second sensor means may derive the second electrical quantity representative of an armature current or a rotational speed of the motor.

The present invention may advantageously includes a resistor connected in a circuit with the armature of the motor and a thyristor connected across the resistor. When the deviation of the sum of the electrical quantities from the reference magnitude is large, the thyristor is adapted to be put in its conducting state to shortcircuit the resistor which cooperate with the regulation of the field current to increase the armature current thereby to render that deviation smaller.

BRIEF DESCRIPTION OF THE DRAWING

The present invention will become more readily apparent from the following detailed description taken in conjunction with the accompanying drawing in which.

DESCRIPTION OF THE PREFERRED EMBODIMENTS

Figure 1:
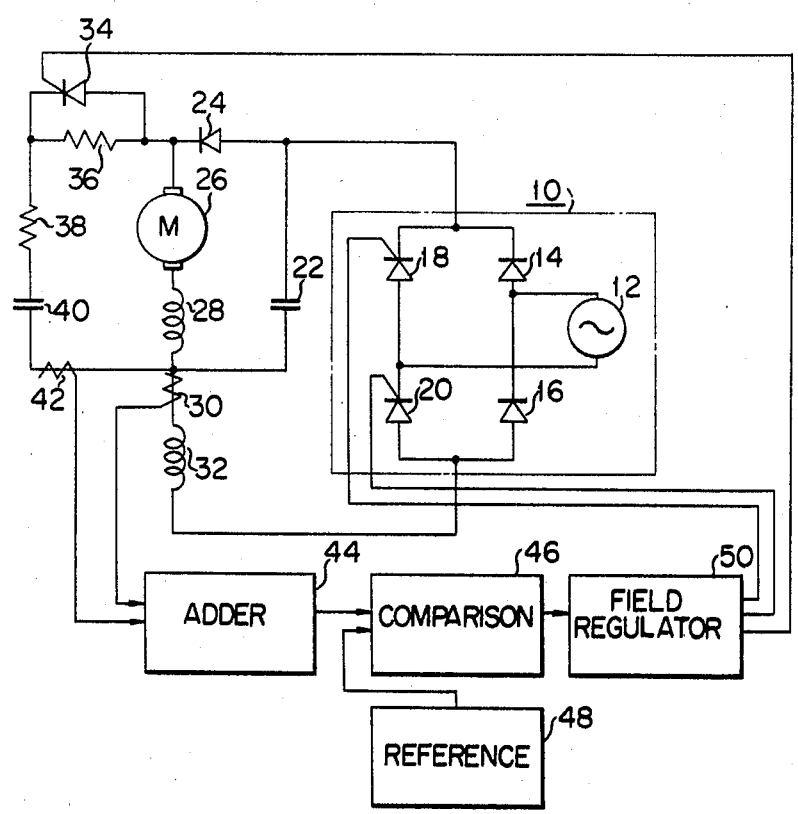
FIG. 1 is a combined circuit and block diagram of a dynamic braking control system constructed in accordance with the principles of the present invention.

Referring now to FIG. 1 of the drawing, it is seen that an arrangement disclosed herein comprises an excitation circuit generally designated by the reference numeral 10 and including a source 12 of alternating current, a pair of serially connected semiconductor flywheel diodes 14 and 16 and a pair of serially connected thyristors 18 and 20 connected across the series combination of diodes. The source 12 is connected across the junction of the two diodes 14 and 16 and the junction of the two thyristors 18 and 20 and phase controlled by the thyristors in the manner well known in the art. The cathode electrodes of the diode and thyristor 14 and 18 respectively are connected together to a first relay element 22 normally closed and closed in the dynamic braking mode of operation. The relay element 22 has connected thereacross a series combination of a semiconductor diode 24 and an armature 26 and an interpole winding 28 of a dc motor M. The diode 24 is so poled that the armature 26 is prevented from short-circuiting by the first relay element 22 when closed.

The arrangement further comprises a first current sensor 30 electrically coupled to a conductor extending between the interpole winding 28 and a field winding 32 connected at one end to the interpole winding 28 and at the other end to the junction of the anode electrodes of the diode and thyristor 16 and 20 respectively. The first sensor 30 serves to sense a current $I_f$ flowing through the field winding 32 to derive a first electrical quantity representative of the sensed magnitude of the field current. The junction of the diode and armature 24 and 26 respectively is connected to a thyristor 34 subsequently connected across a first resistor 36 for limiting a current flowing through the armature 26. The parallel combination of thyristor and first resistor 34 and 36 respectively is connected to a second resistor 38 identical in operation to the first resistor 34 and connected to the junction of the windings 28 and 32 through a second relay element 40 normally open and closeable in the dynamic braking mode of operation. A second sensor 42 is coupled to a conductor extending from the second relay element 40 to the junction of the windings 28 and 32 to sence the current. $I_a$ flowing through the armature 26 to derive a second electrical quantity representative of the sensed magnitude of the armature current.

The first and second sensor 30 and 42 respectively are connected to an adder circuit 44 where the current $I_f$ is added to the current $I_a$. The output of the adder circuit 44 is connected as one input to a comparison circuit 46 having the other input connected to a reference circuit 48 for setting reference magnitude of a dynamic braking force as desired. The comparison circuit 46 compares the output from the adder circuit 44 with the reference magnitude from the reference circuit 48 to supply a deviation therebetween to a field regulator circuit 50. This circuit 50 is connected to the gate electrodes of the thyristors 18, 20 and 34 to control them so that the sum of the currents $I_f$ and $I_a$ equals the reference magnitude from the reference circuit 48.

The arrangement of FIG. 1 is operated as follows. When the dc motor M is in the power running mode of operation a current in one half cycle of the source 12 flows through a closed circuit traced from the source 12 through the diode 14, the diode 24, the armature 26, the interpole winding 28, the field winding 32, and the thyristor 20 and thence back to the source. In the next half cycle of the source 12, a current flows through another closed circuit traced from the source 12 through the thyristor 18, the diode 24, the armature 26, the interpole winding 28, the field winding 32 and the thyristor 20 and thence back to the source. In this way a driving current from the source 12 is supplied to the dc motor M. In these circumstances, the field regulator circuit 50 is operative to control the conduction time of the thyristors 18 and 20. That is, the source 12 is phase controlled to apply the desired magnitude of the driving current to the motor, only in response to the electrical quantity representative of the sensed magnitude of the field current $I_f$.

On the other hand, when the dc motor M is operated in the dynamic braking mode, the first and second relay elements 22 and 40 respectively are put in their closed position. The now closed relay element 22 permit the field winding 30 to be separately excited from the source 12 through the diodes 14, 16, the thyristors 18, 20 and the relay element 22 and presents the driving current from flowing through the armature 26. This causes an electro-motive force to be induced across the armature 26 being rotated at a some rotational speed due to its inertia. This results in a flow of an armature current $I_a$ through the resistors 36 and 38 and the closed relay element 40 while the diode 24 present the armature current from flowing into the closed relay element 22.

Then the sensors 30 and 42 sense the currents $I_f$ and $I_a$ to produce a first and second electrical quantities representative of the sensed current magnitudes respectively. The first and second electrical quantities may be proportional to the sensed magnitudes and are added to each other by the adder circuit 44. The comparison circuit 46 compares the sum of the currents from the adder circuit 44 with the thyristors 18 and 20. This causes an electromotive force to be induced across the armature 26 being rotated with the particular number of rotation in unit time. This results in a flow of current $I_a$ through the resistors 36 and 38.

When the field current remains unchanged, the armature current and therefore a braking force is decreased as the number of rotations in unit time of the armature 26 is reduced.

In order to maintain the braking force at a constant magnitude, it is required only to prevent any decrease in armature current. Therefore it is sufficient to increase the field current as the armature 26 is decreased in the number of rotation in unit time. To this end the first sensor 30 senses the field current to produce a first electrical quantity representative of the sensed magnitude of the field current while the second sensor 42 senses the armature current to produce a second electrical quantity representative of the sensed magnitude of the armature current. Then adder circuit 44 provides the sum of both electrical quantities which is, in turn, compared with the reference magnitude from the reference circuit 48 by the comparison circuit 46. The circuit 46 supplies a deviation of the sum of the electrical quantity from the reference magnitude to the field regulator 50. The regulator circuit 50 controls the conduction time of the thyristors 18 and 20 so as to render the deviation between the compared two smaller, thereby to cause the required field current to flow through the field winding 32. Thus the armature current and therefore the braking force is prevented from decreasing.

If the output from the adder circuit 44 is excessively small as compared the reference magnitude as determined by the comparison circuit 46 (which results from a decrease in the number of rotations in unit time of the motor) then the thyristor 34 is responsive to the output from the field regulator circuit 50 to be conducting thereby to shorcircuit the resistor 36. Thus the armature current becomes higher accordingly.

In this way the field and armature currents $I_f$ and $I_a$ respectively have been sensed and then the electrical representatives are added to each other. The sum thereof has been compared with the reference magnitude from the reference circuit 48 which form a deviation therebetween. The field regulator circuit 50 acting as a gating circuit responds to this deviation of the sum of both currents and the reference provided by the reference circuit 48 to operate the thyristors 18 and 20 so that a decrease in the magnitude of the armature current $I_a$ due to a reduction in the number of rotation in unit time of the motor causes an increase in the magnitude of the field current $I_f$ thereby to maintain the sum of the currents $I_a$ and $I_f$ or $I_a = I_f$ constant. Therefore a braking force substantially equal to the product of the $I_a$ and $I_f$ is maintained at a substantially constant magnitude.

It has been found that with the arrangement of FIG. 1 actually applied to a dc series motor having a continuous power output of 10 kilowatts a change in braking torque has been in the order of ±10 percent for a range of changes in the number of rotation in unit time of the motor corresponding to a ratio of 1 to 3.

Figure 2:
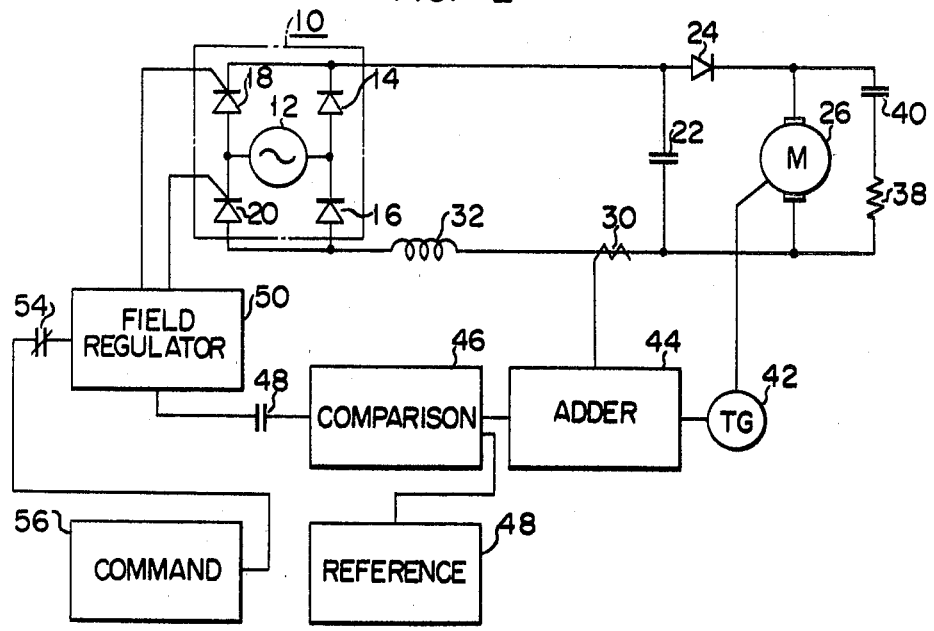
FIG. 2 is a diagram similar to FIG. 1 but illustrating a modification of the present invention.

In FIG. 2 wherein like reference numerals designate the components identical or corresponding to those shown in FIG. 1, the second sensor 40' is the form of a tachometer generator 42' mechanically connected to a dc motor M and strictly to its armature 26 to produce an electrical quantity representative of a rotational speed of the motor. The field regulator circuit 50 has one input connected to the comparison circuit 46 through a third relay element 52 normally open and the other input connected through a fourth normally closed relay element 54 to a command circuit 56 for instructing the power running mode of operation.

Upon putting the dc motor in the power running mode of operation, the command circuit 56 applies an output to the field through the closed relay element 54 to instruct the field regulator circuit 50 to control the thyristors 18 and 20 in the similar manner as above described in conjunction with FIG. 1 excepting that the regulator circuit is under the control of the command circuit 56 but does not rely on the sensed field current.

Where the motor is operated in the dynamic running mode, the first, second, and third relay elements 22, 40 and 52 and 54 are in their closed position while the fourth relay element 54 is in its open position ensuring that the command circuit 56 is prevented from applying the output to the field regulator circuit. Therefore the arrangement is substantially identical in circuit configuration to that shown in FIG. 1 except for the tachometer generator 40' being substituted for the second sensor 40. Therefore it will readily be understood that the arrangement is operated in the similar manner as previously described in conjunction with FIG. 1.

The present invention has several advantages. For example, the braking force can be controlled in step-less manner by differently setting the sum of the armature and field currents. In the deceleration process, the rotational speed of the dc motor can be controlled with a high degree of accuracy.

While the present invention has been illustrated and described in conjunction with a few preferred embodiments thereof it is to be understood that numerous changes and modifications may be resorted to without departing from the spirit and scope of the invention.

We claim:

1. A control system for controlling dynamic braking of a dc motor, comprising, in combination, a dc motor including an armature and a field winding, excitation means for separately exciting said field winding of the dc motor, first sensor means for sensing a current flowing through said field winding to derive a first electrical quantity representative of the sensed magnitude of the current, second sensor means for sensing a voltage induced across said armature to derive a second electrical quantity representative of the sensed magnitude of the voltage, a adder means connected to said first and second sensor means to form the sum of said first and second electrical quantities, field regulator means electrically coupled to said adder means to control said excitation means to regulate the current flowing through said field winding to maintain the sum of said first and second electrical quantities from said adder means constant, and said second sensor means comprising means to derive an electrical quantity representative of a sensed magnitude of a rotational speed of the dc motor.

2. A control circuit for controlling dynamic braking of a dc motor comprising, means connected in use to a dc motor for operating in a dynamic braking mode, means to develop a signal proportional to field winding current of the dc motor, means to develop a signal proportional to an armature current of the dc motor, means to add the two signals comprator means to compare the added two signals with a reference signal and develop a deviation signal corresponding to the difference between the reference signal and the two added signals, excitation means, a field regulator connected to said excitation means receptive of the deviation signal varying the field current to maintain the sum of the added signals equal to the reference signal thereby to maintain the dynamic braking force constant as the speed of the armature reduces by maintaining the armature current from reducing as the speed reduces.

3. A control circuit according to claim 2, in which said excitation means comprises means to increase the field current as the revolutions per unit time of the armature decrease thereby to maintain the braking force constant.

4. A control circuit according to claim 3, in which the last mentioned means comprises thyristors connected in operation to the field winding of the motor, said excitation means including a power source connected to the thyristors, and said field regulator connected to control the conduction period of said thyristors for controlling energization to the field winding as a function of the difference between the deviation signal and reference signal.

5. A control circuit according to claim 4, including thyristor means for controlling armature current to increase it when a decrease of the speed of rotation of the armature occurs.

6. A control system for controlling dynamic braking of a dc motor, comprising, in combination, a dc motor including an armature and a field winding, excitation means for separately exciting said field winding of the dc motor, first sensor means for sensing a current flowing through said field winding to derive a first electrical quantity representative of the sensed magnitude of the current, second sensor means for sensing a voltage induced across said armature to derive a second electrical quantity representative of the sensed magnitude of the voltage, an adder means connected to said first and second sensor means to form the sum of said first and second electrical quantities, field regulator means electrically coupled to said adder means to control said excitation means to regulate the current flowing through said first and second electrical quantities from said adder means constant, said second sensor means comprising means to derive electrical quantity representative of a sensed magnitude of an armature current, a resistor and a thyristor connected in a circuit with said armature, said resistor limiting the armature current, said thyristor being responsive to a deviation of the output from said adder means from a reference magnitude therefor to be conducting to shortcircuit said resistor.

* * * * *